United States Patent
Walter et al.

(10) Patent No.: US 8,991,836 B2
(45) Date of Patent: Mar. 31, 2015

(54) CHILD SEAT FOR A SHOPPING CART

(75) Inventors: Ivor Michel Walter, Boulder, CO (US); Ning Siu Sin, Hong Kong (CN)

(73) Assignee: AMSA, Inc., Boulder, CO (US)

( * ) Notice: Subject to any disclaimer, the term of this patent is extended or adjusted under 35 U.S.C. 154(b) by 210 days.

(21) Appl. No.: 13/458,438

(22) Filed: Apr. 27, 2012

(65) Prior Publication Data

US 2013/0069403 A1    Mar. 21, 2013

Related U.S. Application Data

(63) Continuation-in-part of application No. 29/402,205, filed on Sep. 21, 2011, now Pat. No. Des. 658,841.

(51) Int. Cl.
*B62D 39/00*    (2006.01)
*B62B 3/14*    (2006.01)

(52) U.S. Cl.
CPC ...................................... *B62B 3/144* (2013.01)
USPC ............. 280/33.993; 280/33.991; 280/33.992

(58) Field of Classification Search
CPC .......... B62B 3/14; B62B 3/144; B62B 3/1444
USPC ............................ 280/33.991, 33.992, 33.993
See application file for complete search history.

(56) References Cited

U.S. PATENT DOCUMENTS

| | | | |
|---|---|---|---|
| D102,991 S | 2/1937 | Nelson | |
| D178,445 S | 7/1956 | Young | |
| 2,964,326 A | 12/1960 | Schray | |
| 3,329,441 A * | 7/1967 | Mills, Jr. | ................... 280/33.993 |
| 3,645,554 A | 2/1972 | Von Stein et al. | |
| D246,301 S | 11/1977 | Trubiano | |
| 4,065,142 A | 12/1977 | Rehrig | |
| 4,125,570 A | 11/1978 | Chang et al. | |
| 4,176,849 A | 12/1979 | Rehrig | |
| D259,779 S | 7/1981 | Bond | |
| 4,356,651 A | 11/1982 | Barlow | |
| D280,858 S | 10/1985 | Muellner et al. | |
| 4,560,180 A | 12/1985 | Ulmer | |
| 4,632,411 A | 12/1986 | Badger | |
| 4,643,280 A | 2/1987 | Hensley | |

(Continued)

OTHER PUBLICATIONS

Plasti-Cart Max200 Brochure from website [http://www.plasti-cart.com/page.asp?SectionID=2&PageID=72] showing prior art cart manufactured by Plasti-Cart. Cart shown is admitted prior art to current design by Applicant.

(Continued)

*Primary Examiner* — Hau Phan
*Assistant Examiner* — Jacob Meyer
(74) *Attorney, Agent, or Firm* — Margaret Polson; Polson & Associates, PC

(57) ABSTRACT

A child seat for a shopping cart comprises a gate, a back rest, two arms and a seat. The arms connect to the gate at one end and the back rest at the other. The arms connect to the gate at an angle, which provides resistance so that the back rest does not fall while buckling the child into the seat. The arms terminate in a chamber, which encompasses the back rest and allows the back rest to fold. One end of the seat terminates in a channel, which encompasses the base wire of the back rest, allowing the back rest to rotate. The second end of the seat terminates in a second channel, which encompasses attachment members on the gate, thereby allowing the seat to rotate. The attachment members include wires, which interact with a step in the second channel to lock the seat to the gate.

20 Claims, 9 Drawing Sheets

(56) References Cited

U.S. PATENT DOCUMENTS

| | | | |
|---|---|---|---|
| D288,619 S | 3/1987 | Trubiano | |
| 4,742,943 A | 5/1988 | Trubiano | |
| 4,867,464 A * | 9/1989 | Cook | 280/33.993 |
| 4,949,997 A | 8/1990 | Champagne | |
| D314,269 S | 1/1991 | Trubiano | |
| D321,577 S | 11/1991 | Ellis et al. | |
| 5,211,410 A | 5/1993 | Trubiano | |
| D338,149 S | 8/1993 | Adams | |
| 5,265,893 A | 11/1993 | Ettlin | |
| D348,549 S | 7/1994 | Trubiano | |
| 5,348,323 A | 9/1994 | Trubiano | |
| 5,368,318 A | 11/1994 | Rehrig et al. | |
| 5,385,357 A | 1/1995 | Trubiano | |
| 5,401,042 A | 3/1995 | Ruger | |
| 5,435,582 A * | 7/1995 | Davidson | 280/33.992 |
| 5,439,253 A * | 8/1995 | Trubiano | 280/801.1 |
| D363,589 S | 10/1995 | Lafleur et al. | |
| 5,505,472 A | 4/1996 | Trubiano | |
| 5,507,507 A * | 4/1996 | Davidson | 280/33.991 |
| 5,553,877 A | 9/1996 | Huang | |
| D377,255 S | 1/1997 | Rehrig | |
| 5,595,394 A | 1/1997 | Adamson | |
| D379,834 S | 6/1997 | Huang | |
| 5,641,200 A * | 6/1997 | Howell | 297/256.17 |
| 5,702,114 A | 12/1997 | Downing et al. | |
| D411,904 S | 7/1999 | Risholm et al. | |
| 5,961,133 A | 10/1999 | Perry | |
| 6,186,521 B1 * | 2/2001 | Divoky et al. | 280/33.993 |
| D443,968 S | 6/2001 | Porter | |
| D445,230 S | 7/2001 | Deal et al. | |
| D445,231 S | 7/2001 | Porter | |
| D453,077 S | 1/2002 | Chen | |
| D463,647 S | 9/2002 | Deal et al. | |
| D470,292 S | 2/2003 | Johnson et al. | |
| 6,533,297 B2 | 3/2003 | Saccani | |
| 6,644,674 B2 * | 11/2003 | Simard | 280/33.991 |
| 6,676,139 B1 | 1/2004 | Saccani | |
| D492,829 S | 7/2004 | Babkes et al. | |
| D493,594 S | 7/2004 | Prather et al. | |
| 6,832,768 B2 | 12/2004 | Duchene et al. | |
| 6,981,708 B1 | 1/2006 | Tucker et al. | |
| D523,207 S | 6/2006 | Tucker et al. | |
| 7,063,337 B2 * | 6/2006 | Russell et al. | 280/33.993 |
| 7,104,552 B2 | 9/2006 | Swanson et al. | |
| 7,237,782 B2 | 7/2007 | Tucker et al. | |
| D550,423 S | 9/2007 | Splain et al. | |
| 7,287,764 B2 * | 10/2007 | Russell et al. | 280/47.23 |
| D583,523 S | 12/2008 | Deal et al. | |
| D584,024 S | 12/2008 | Stark | |
| D588,774 S | 3/2009 | Peota et al. | |
| 7,673,886 B2 | 3/2010 | Ondrasik | |
| D639,521 S | 6/2011 | Walter | |
| D643,175 S * | 8/2011 | Peota et al. | D34/27 |
| D644,393 S * | 8/2011 | Walter | D34/21 |
| 8,002,290 B2 * | 8/2011 | Russell et al. | 280/33.993 |
| D644,809 S * | 9/2011 | Walter | D34/21 |
| D645,222 S * | 9/2011 | Walter | D34/21 |
| D645,631 S * | 9/2011 | Walter | D34/21 |
| D646,041 S | 9/2011 | Berthiaume et al. | |
| D648,914 S | 11/2011 | Walter | |
| D648,915 S * | 11/2011 | Walter | D34/21 |
| D658,841 S * | 5/2012 | Walter | D34/27 |
| D660,542 S * | 5/2012 | Walter | D34/27 |
| D665,552 S * | 8/2012 | Walter | D34/21 |
| D672,111 S * | 12/2012 | Walter | D34/21 |
| D680,704 S * | 4/2013 | Walter | D34/27 |
| D685,972 S * | 7/2013 | Walter | D34/21 |
| D692,201 S * | 10/2013 | Walter | D34/27 |
| D693,981 S * | 11/2013 | Walter | D34/27 |
| 8,632,080 B2 * | 1/2014 | Russell et al. | 280/33.993 |
| 2001/0022436 A1 * | 9/2001 | Simard | 280/33.991 |
| 2003/0151219 A1 * | 8/2003 | Simard | 280/47.35 |
| 2004/0051263 A1 | 3/2004 | Prather et al. | |
| 2004/0090025 A1 * | 5/2004 | Frommherz | 280/33.993 |
| 2005/0151333 A1 * | 7/2005 | Russell et al. | 280/33.993 |
| 2006/0273536 A1 | 12/2006 | Ondrasik | |
| 2008/0100010 A1 * | 5/2008 | Russell et al. | 280/33.993 |
| 2008/0265534 A1 | 10/2008 | Ondrasik | |
| 2009/0261545 A1 | 10/2009 | Jones | |
| 2010/0078902 A1 | 4/2010 | Lee et al. | |
| 2011/0304111 A1 * | 12/2011 | Russell et al. | 280/33.993 |

OTHER PUBLICATIONS

Technibilt 5640 Scan of website [http://www.technibilt.com/carts/detail.php?id=28] showing prior art cart manufactured by Techibilt. Cart shown is admitted prior art to current design by Applicant.

Wanzl EL Series Brochure from website [http://www.wanzl.com/000/En/Home/Products/Self-Service_systems/Shopping_Trolleys/Shopping_Trolley_Series/EL_Series.html] showing prior art carts manufactured by Wanzl. Carts shown are admitted prior art to current design by Applicant.

U.S. Appl. No. 29/410,149, filed Jan. 4, 2012; Inventor: Ivor Michel Walter.

U.S. Appl. No. 29/417,407, filed Apr. 3, 2012; Inventor: Ivor Michel Walter.

U.S. Appl. No. 29/419,452, filed Apr. 27, 2012; Inventor: Ivor Michel Walter.

* cited by examiner

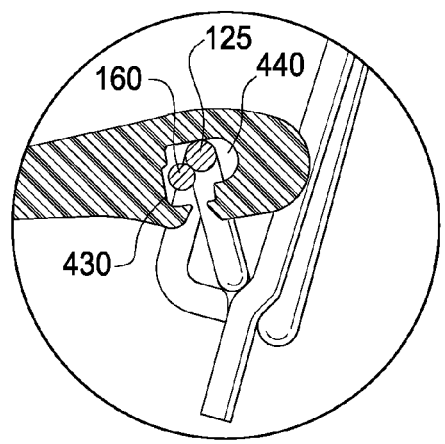
FIG.13
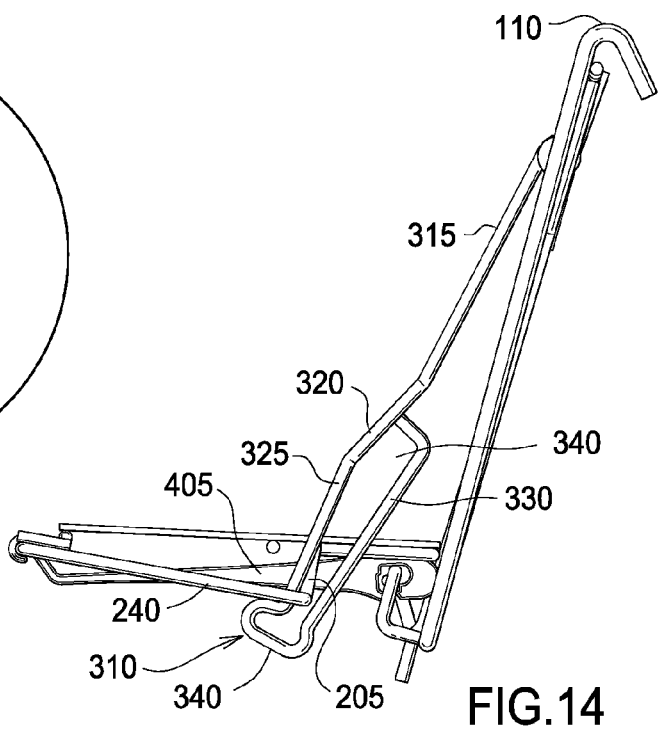
FIG.14
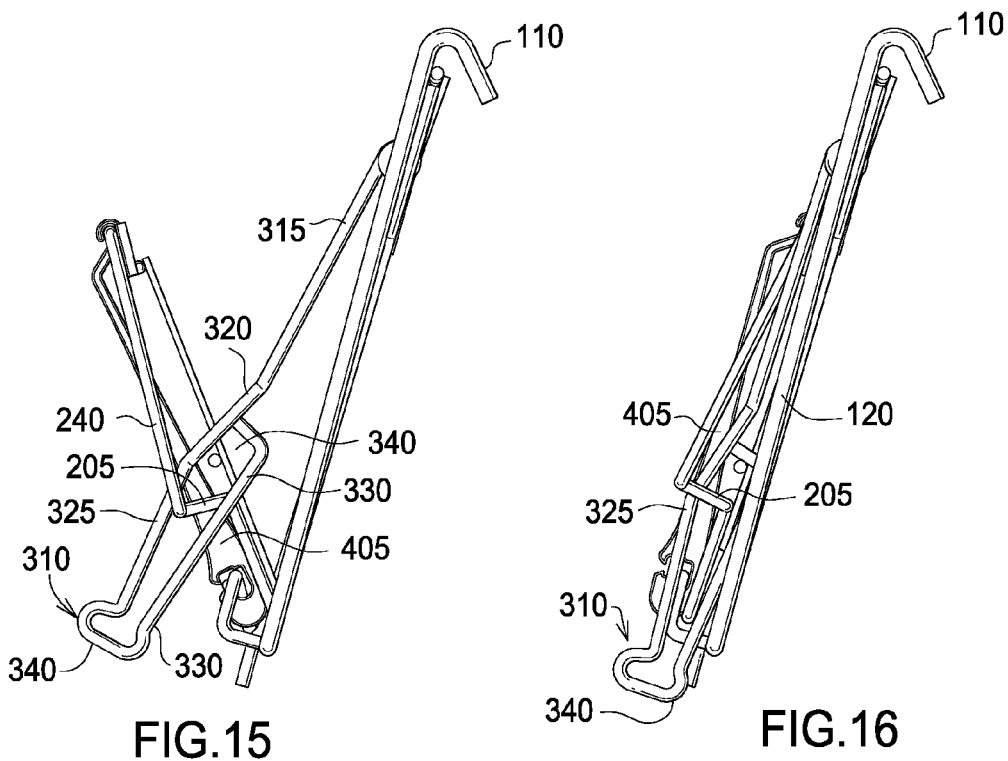
FIG.15
FIG.16

CHILD SEAT FOR A SHOPPING CART

CROSS REFERENCE APPLICATIONS

This application is a continuation-in-part application claiming the benefits of design application No. 29/402,205 filed Sep. 21, 2011 and issued as U.S. Des. Pat. No. D658,841 on May 1, 2012, the disclosure of which is incorporated herein by reference for all purposes.

BACKGROUND

The child seats for shopping carts which are currently available have a number of limitations. Existing folding mechanisms have a bulky profile when folded, thereby negatively affecting the ability of shopping carts to nest and reducing the usable area of the shopping basket when the child seat is not in use. Further, current child seats are sized to fit in single-tiered deep-basket shopping carts.

Moreover, many current child seats are attached using methods that leave small crevices and sharp edges, allowing a child to insert his or her fingers, which may lead to injury. Existing back rests are made much taller than the span of the corresponding seat.

The foregoing example of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

The present child seat provides a number of improvements over existing child seats. In general, these improvements include, but are not limited to the following aspects. First, the child seat of the present application can be used in a shallow basket of a two-tier cart. Second, the present child seat allows the child to sit low in the basket, lowering the center of gravity making it much safer than a conventional folding child seat mechanism in a two-tier cart. Third, the child seat of the present application folds away completely, allowing maximum use of the basket area when there is no child in the cart. Finally, the present child seat is designed to fold really flat whether open or closed using the least amount of space and thus allowing tighter cart nesting and more basket clearance between upper and lower baskets.

Furthermore, the angle of the arm provides resistance so that the back rest will not easily fall forward when buckling a child into the seat. The height of the gate in relation to the span of the seat allows for both comfort and a low-profile when folded. The locking mechanism attaching the back rest to the seat allows for multiple nesting options. The unique shape of the arm allows it to have an extremely low profile when the seat is closed. This unique shape allows the seat to be flat when opened. The angle at which the seat connects to the backrest allows for a taller back rest without making the seat too long. The method used to attach the arms to the gate prevents arms from rotating or moving diagonally, thereby providing more stability. This same method minimizes sharp edges and small crevices, reducing the risk of injury to a small child.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

FIG. 14 is a side elevation view of the left and right sides, which are mirror images, of the child seat in a partially closed position.
FIG. 15 is a side elevation view of the left and right sides, which are mirror images, of the child seat in a partially closed position between the partially closed position on FIG. 15 and the fully closed position of FIG. 16.
FIG. 16 is a side elevation view of the left and right sides, which are mirror images, of the child seat in the folded position it is in when the carts are nested together.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

Figure 1:
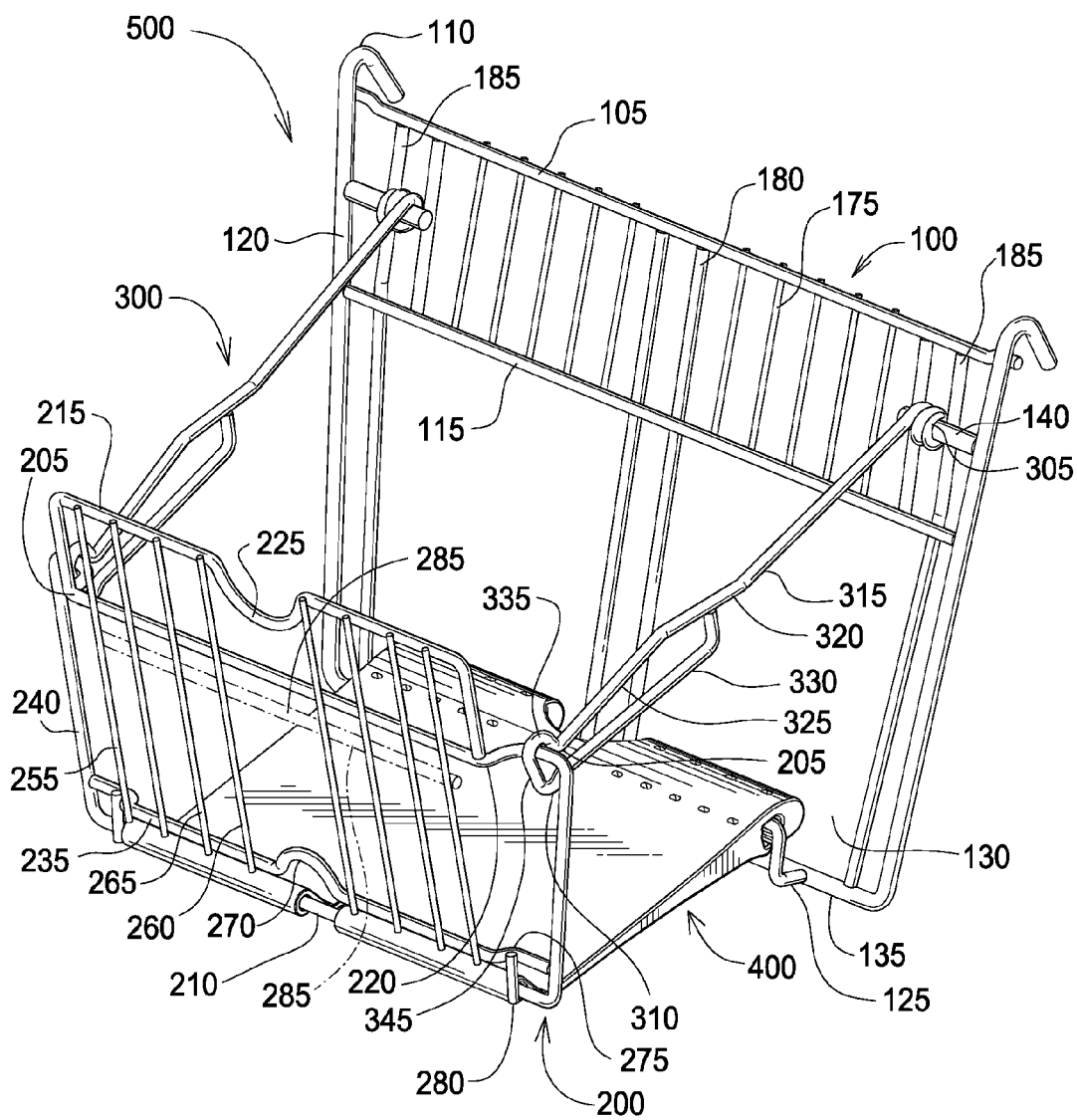
FIG. 1 is a front perspective view the combined child seat and retention flap for use with a shopping cart of the present application.

Turning first to FIG. 1, a child seat 500 for use with a shopping cart is shown. The child seat generally comprises a gate 100, back rest 200, arms 300 and base 400.

Figure 2:
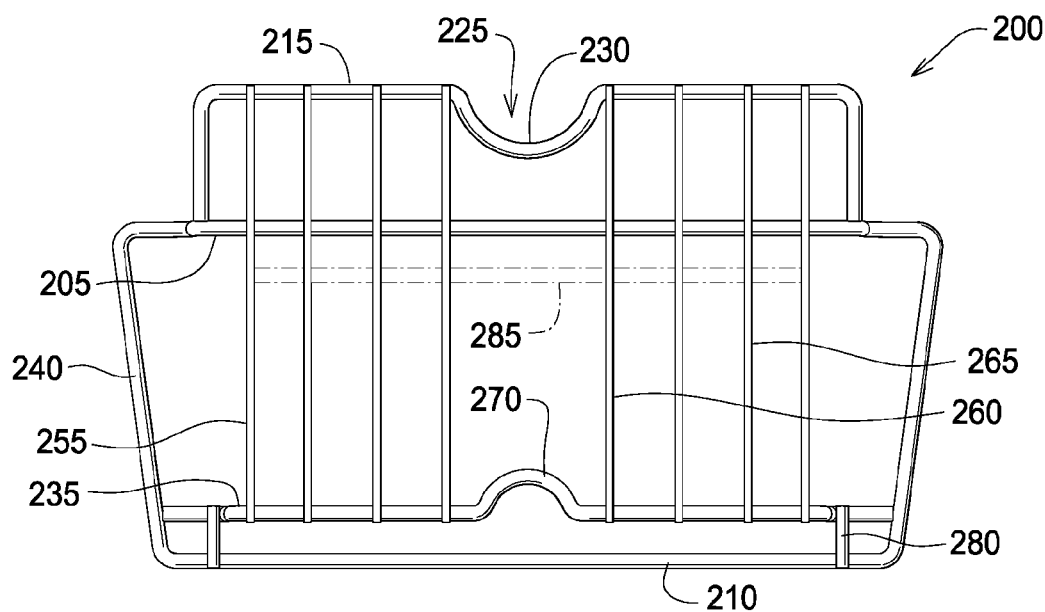
FIG. 2 is a front plan view of the back rest of FIG. 1.

Turning next to FIG. 2, back rest 200 includes base wire 210, top wire 215 and sides 240. A first horizontal support member 205 and second horizontal support member 235 are located between base wire 210 and top wire 215. First horizontal support member 205 includes upper jog 220. Second horizontal support member 235 includes second divot 270 and lower jog 275. Outer vertical support members 255, intermediate vertical support members 265, and central vertical support members 260 support extend from top wire 215 to base wire 210. Enclosing wires 280 extend from base wire 280 to second horizontal supporting member 235. An optional attachment bar 285 is mounted from one outer vertical support member 255 to the other below and substantially parallel to first horizontal support member. If attachment bar 285 is included, a seat belt mechanism 600 may be mounted to attachment bar 285.

In the depicted embodiment, first horizontal support member 205 is approximately 335 mm in length. The width of back rest 200 is approximately 400 mm. The height of back rest 200 from base wire 210 to top wire 215 is approximately 195 mm. The width of upper jog 220 is approximately 30 mm. The length of top wire is approximately 270 mm. The height from first horizontal support member 205 to top wire 215 is approximately 55 mm. The height from base wire 210 to first horizontal support member 205 is approximately 140 mm. The distance from the apex of first divot 225 to top wire 215 is approximately 30 mm. The height from base wire 210 to second horizontal support member 235 is approximately 121 mm. The angle from left or right side 240 to base wire 210 is approximately 97 degrees. The radius of the bend at the intersection of left or right side 240 and base wire 210 is approximately 4 mm. The radius of second divot 270 is approximately 15 mm. The distance between enclosing wires 280 is approximately 260 mm. The length of base wire 210 is approximately 303 mm. The angle of upper jog 220 is approximately 97 degrees. The distance between top wire 215 and the furthest distance of upper jog 220 is approximately 37 mm. The distance between adjacent outer vertical support members 255 is approximately 20 mm. The distance between central vertical support members 260 is approximately 69 mm. The radius of first divot 225 is approximately 25 mm. The distance between adjacent intermediate vertical support members 265 is approximately 25 mm. A person having an ordinary level of skill in the art will understand that the disclosed measurements apply to the depicted embodiment. Differing measurements which approximately preserve the ratios inherent in the disclosed measurements are anticipated by the present disclosure.

Figure 3:
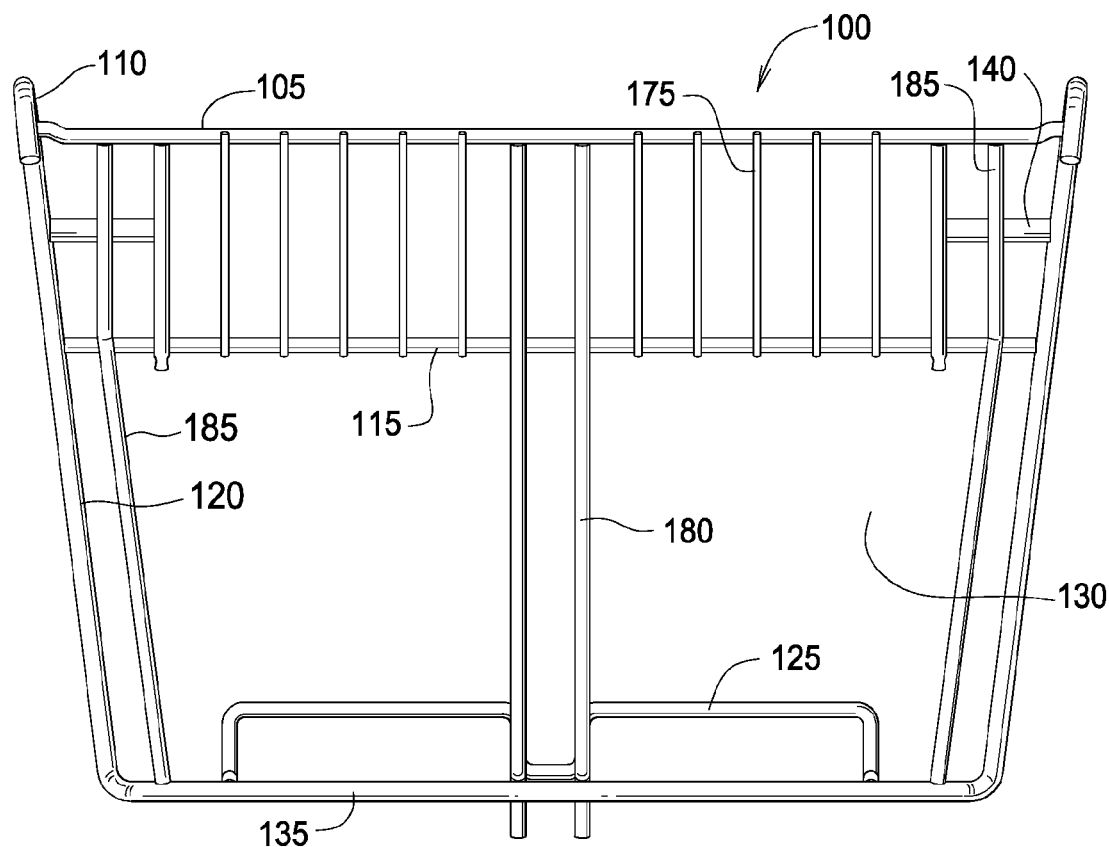
FIG. 3 is a front plan view of the gate of FIG. 1.

Turning next to FIG. 3, gate 100 includes top wire 105, base wire 135 and sides 120. Sides 120 include hooks 110. Intermediate wire 115 is located between top wire 105 and base wire 135. In the depicted embodiment, intermediate wire 115 extends the entire width of gate 100. Outer vertical support members 185 extend the entire length of gate 100, from top wire 105 to base wire 135. Outer vertical support members 185 run parallel to sides 120 from base wire 135 to the approximate intersection of intermediate wire 115. Near the intersection with intermediate wire 115, outer vertical support members become parallel to lateral vertical support members 175. Lateral vertical support members 175 extend from top wire 105 to intermediate wire 115. In the depicted embodiment, lateral vertical support members 175 are arranged equidistantly across the span from central vertical support members 180 to outer vertical support members 185. The spacing of lateral vertical support members creates a mesh that a child can't put his or her hand through. Also, not close enough for a child to get his or her finger caught in. Optionally, central vertical support members 180 may extend from top wire 105 past base wire 135 approximately 15 mm. If the extension is present, it acts as a gate stop. The intersection of outer vertical support members 185 with base wire 135 and intermediate wire 115 creates openings 130. Attachment members 125 are mounted to base wire 135. Attachment members 125 are stepped in relation to gate 100, with a first portion 145 substantially perpendicular to base wire 135, a second portion 150 substantially parallel to base wire 135, and third portion 155 substantially perpendicular to base wire 135. A bar 160 is attached to second perpendicular portion 155. A wire 140 is attached to each side 120 of gate 100. Wire 140 is approximately parallel to top wire 105, and is approximately equidistant between top wire 105 and intermediate wire 115. Wire 140 extends past outer vertical support member 185 and terminates in a connection with the first lateral vertical support member 175 it encounters. Wire 140 creates a hinge for arm 300 to attach to gate 100. Optionally, wire 140 could extend past the first lateral vertical support member it encounters.

In the depicted embodiment, top wire 105 of gate 100 measures approximately 414 mm in length. The distance from the end of hooks 110 to second perpendicular portion 155 is approximately 65 mm. The combined length of top wire 105 and hooks 110 is approximately 434 mm. The radius of the bend in hooks 110 is approximately 6 mm. The height from top wire 105 to intermediate wire 115 is approximately 95 mm. The height from intermediate wire 115 to base wire is approximately 188 mm. The left and right sides 120 of gate 100 measure approximately 321 mm in height. The combined length of the attachment members 125 measures approximately 265 mm. The height of each attachment member 125 is approximately 33 mm. The length of each attachment member is approximately 30 mm. The length of base wire 135 is approximately 366 mm. The height from intermediate wire 115 to wires 140 is approximately 55 mm. The height from base wire 135 to highest point is approximately 305 mm. The angle between either side 120 and base wire 135 is approximately 97 degrees. The radius of the bend at the intersection of either side 120 and base wire 135 is approximately 6 mm. The distance between a first end of one bar 160 to a second end of the other bar 160 is approximately 235 mm. The distance between bars 160 is approximately 65 mm. The distance between attachment members is approximately 20 mm. The distance between adjacent lateral vertical support members 175 is approximately 17 mm. The distance between central vertical support members 180 is approximately 20 mm. A person having an ordinary level of skill in the art will understand that the disclosed measurements apply to the depicted embodiment. Differing measurements which approximately preserve the ratios inherent in the disclosed measurements are anticipated by the present disclosure.

Figure 4:
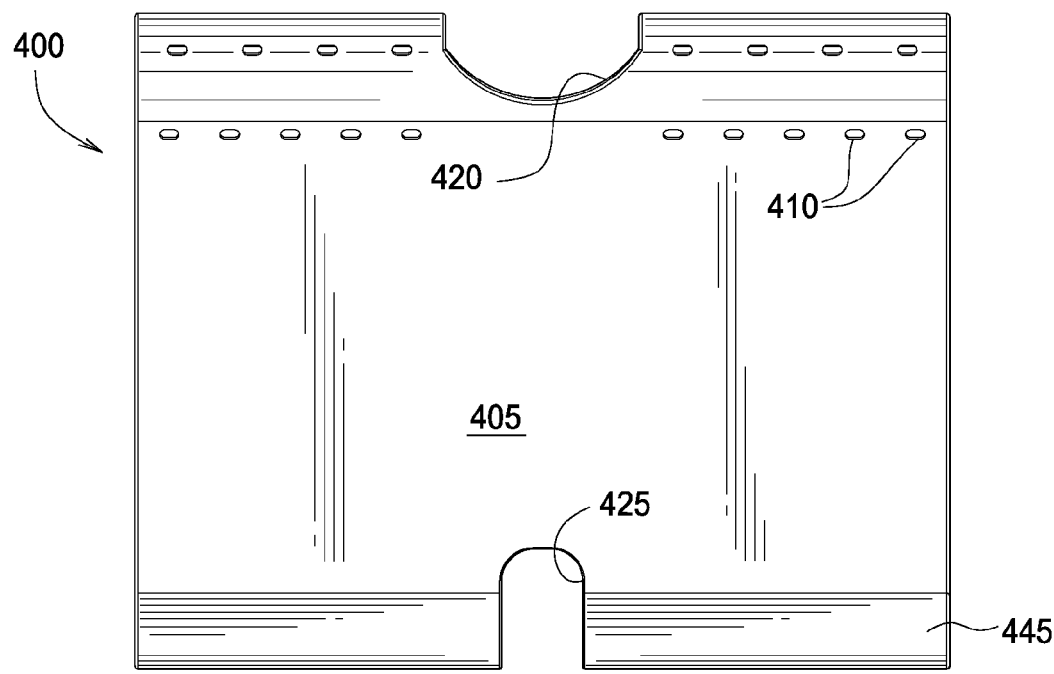
FIG. 4 is a top plan view of the base of FIG. 1.
Figure 5:
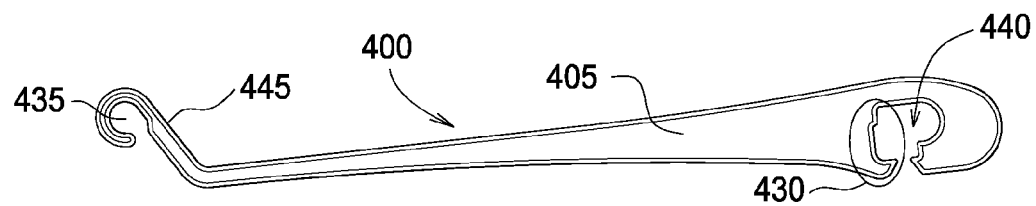
FIG. 5 is a side plan view of the base of FIG. 4.

FIGS. 4 and 5 depict base 400, which comprises seat 405. Seat 405 includes holes 410. Holes 410 provide drainage. Ribs 415 on the back of seat 405 provide strength and support. Front divot 420 allows base 400 to fold. Back divot 425 allows a user to grasp and open base 400. First channel 430 includes stepped portion 440. Seat 405 also includes inclined portion 445, which terminates in second channel 435.

In the depicted embodiment, seat 405 is approximately 250 mm wide and has a span of approximately 200 mm. The total height of seat 405 from the lowest point to the top on inclined portion 445 is approximately 38.5 mm. The width of front divot 420 is approximately 59 mm. The height of inclined portion 445 is approximately 19.5 mm. The height of seat 405 at the gate end, where first channel 430 is located, is approximately 22 mm. At its widest point, first channel 430 is approximately 15 mm. The width of stepped portion 440 is approximately 13.8 mm. First channel 430 is approximately 12 mm deep. The opening to first channel 430 is approximately 3 mm wide. The radius of second channel 435 is approximately 7 degrees. The entrance to second channel 435 is approximately 3.3 mm. The distance between the base of first channel 430 and top of seat 405 is approximately 6 mm. Holes 410 are approximately 3 mm tall and 6 mm wide. Holes 410 are approximately 3 mm from the outside of first channel 430. A person having an ordinary level of skill in the art will understand that the disclosed measurements apply to the depicted embodiment. Differing measurements which approximately preserve the ratios inherent in the disclosed measurements are anticipated by the present disclosure.

Figure 6:
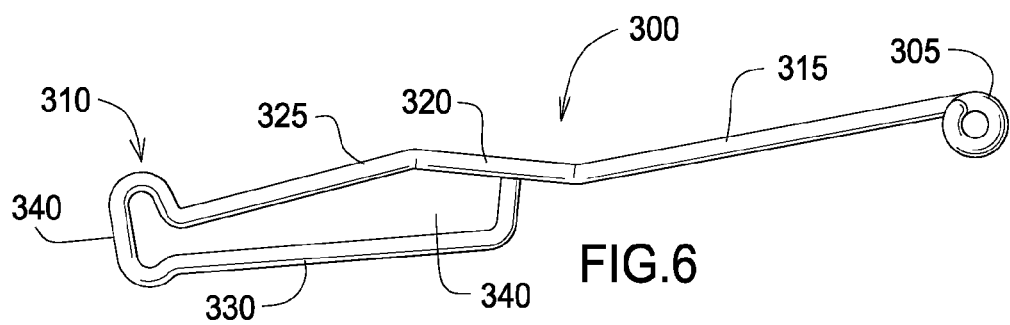
FIG. 6 is a side plan view of one of the arms of FIG. 1.

Turning next to FIG. 6, arms 300 comprise a first portion 315, a second portion 320, a third portion 325, a fourth portion 330 and a bulbous protrusion 310. The intersection of second portion 320 and fourth portion 330 at one end, and the intersection of bulbous protrusion 310 with fourth portion 330 and third portion 325 at the other create chamber 340. Arm 300 is designed to have the lowest profile when base 400 is closed. Second portion of arm 320 and third portion of arm 325 are angled with respect to one another to allow seat 405 down. Bulbous protrusion 310 allows seat 405 to be flat when open.

In the depicted embodiment, arms 300 are approximately 278 mm in total length. Arms 300 are angled such that first portion of arm 315 is offset from bulbous protrusion 310 approximately 31 mm. The height from base of coil 305 to the top of bulbous protrusion 310 is approximately 42 mm. The interior diameter of coil 305 is approximately 8 mm. The exterior diameter of coil 305 is approximately 20 mm. The width of coil 305 is approximately 15 mm. The length of first portion of arm 315 including coil 305 is approximately 134 mm. The second portion of arm 320 inclines at an approximate 158 degree angle from first portion of arm 315. Third portion of arm 325 declines at an approximate 31 degree angle from second portion of arm 320. Third portion of arm 325 terminates in bulbous protrusion 310, which extends at a 94 degree angle from third portion of arm 325. Bulbous protrusion 310 includes a first bend 335, which has a 6 degree bend with a radius of approximately 4 mm. The chamber 340 between the intersection of third portion of arm 325 and bulbous protrusion 310 on one side, and the intersection point of bulbous protrusion 310 and fourth portion of arm 330 on the other side is approximately 8 mm. Bulbous protrusion 310 has a length of approximately 37 mm. The distance between the intersections of first portion of arm 315 and second portion of arm 320 and the intersection of second portion of arm 320 and fourth portion of arm 330 is approximately 17 mm. The distance between the intersection of second portion of arm 320 and fourth portion of arm 330 and the base 345 of bulbous portion 310 is approximately 125 mm. The angle between the distal end 350 of coil 305 and third portion of arm 325 is approximately 4 degrees. Bulbous protrusion 310 has a width of approximately 6 mm. A person having an ordinary level of skill in the art will understand that the disclosed measurements apply to the depicted embodiment. Differing measurements which approximately preserve the ratios inherent in the disclosed measurements are anticipated by the present disclosure.

Figure 7:
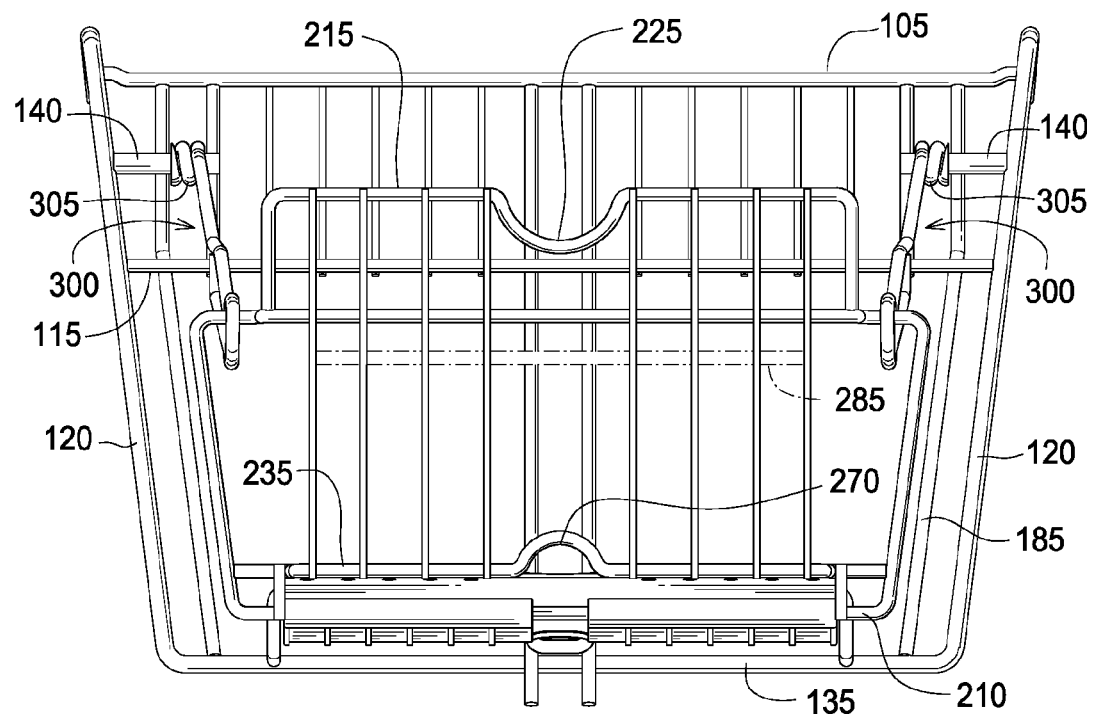
FIG. 7 is a front elevation view of FIG. 1
Figure 8:
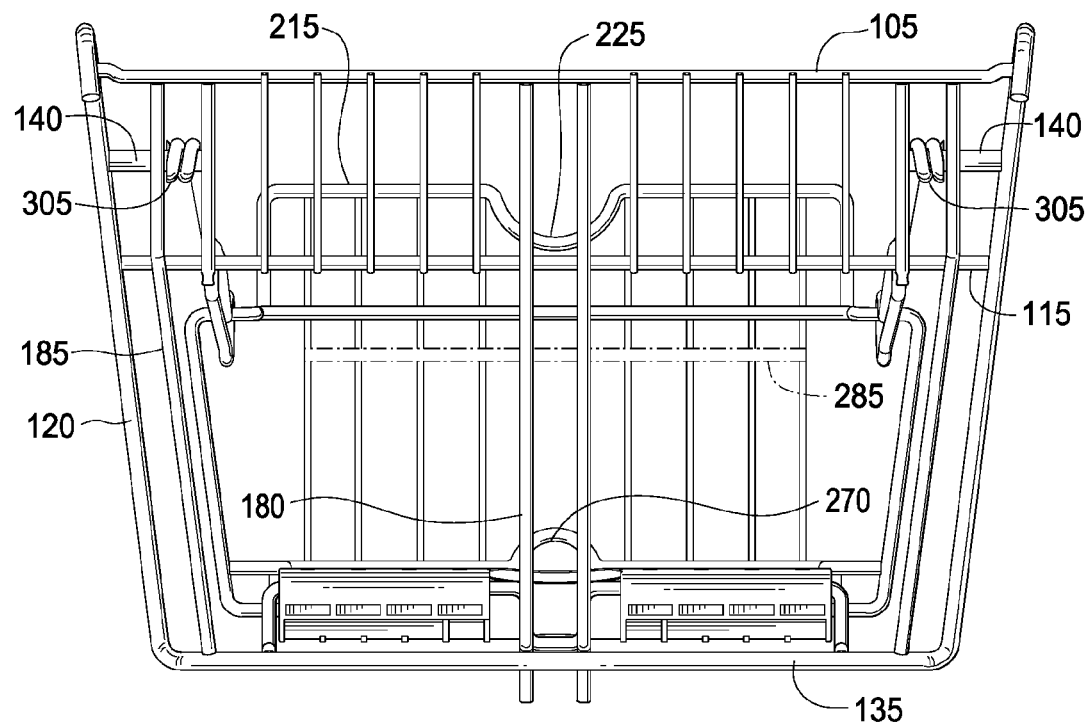
FIG. 8 is a back elevation view of FIG. 1.
Figure 9:
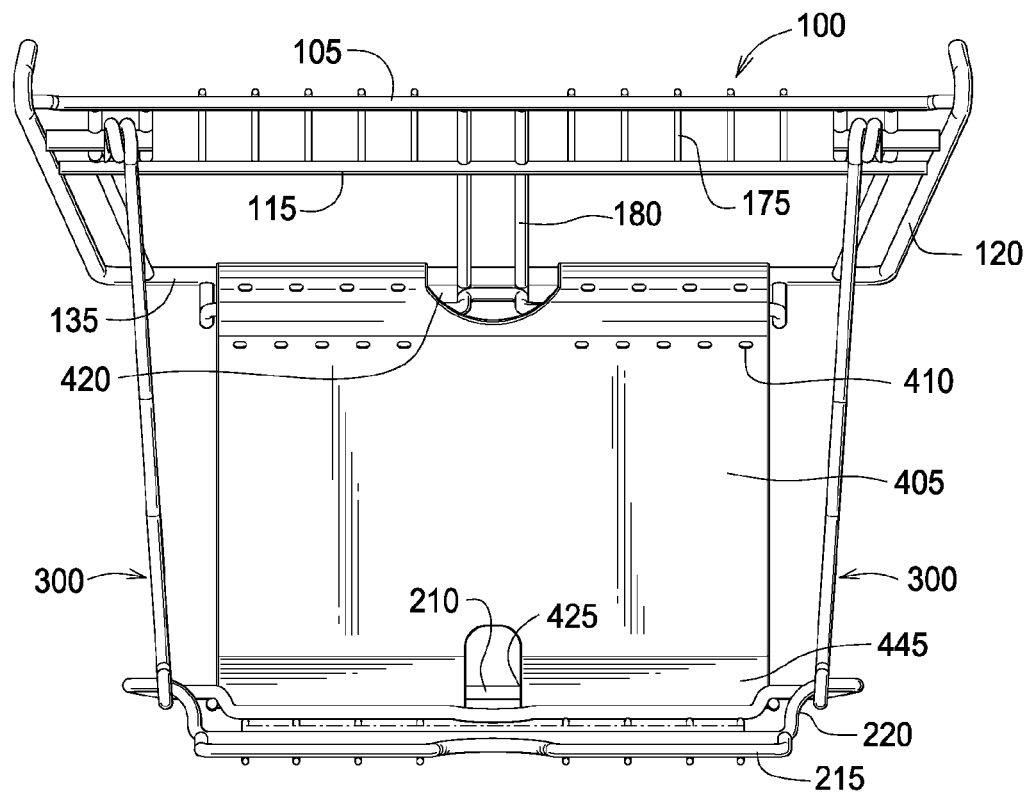
FIG. 9 is a top plan view of FIG. 1.
Figure 10:
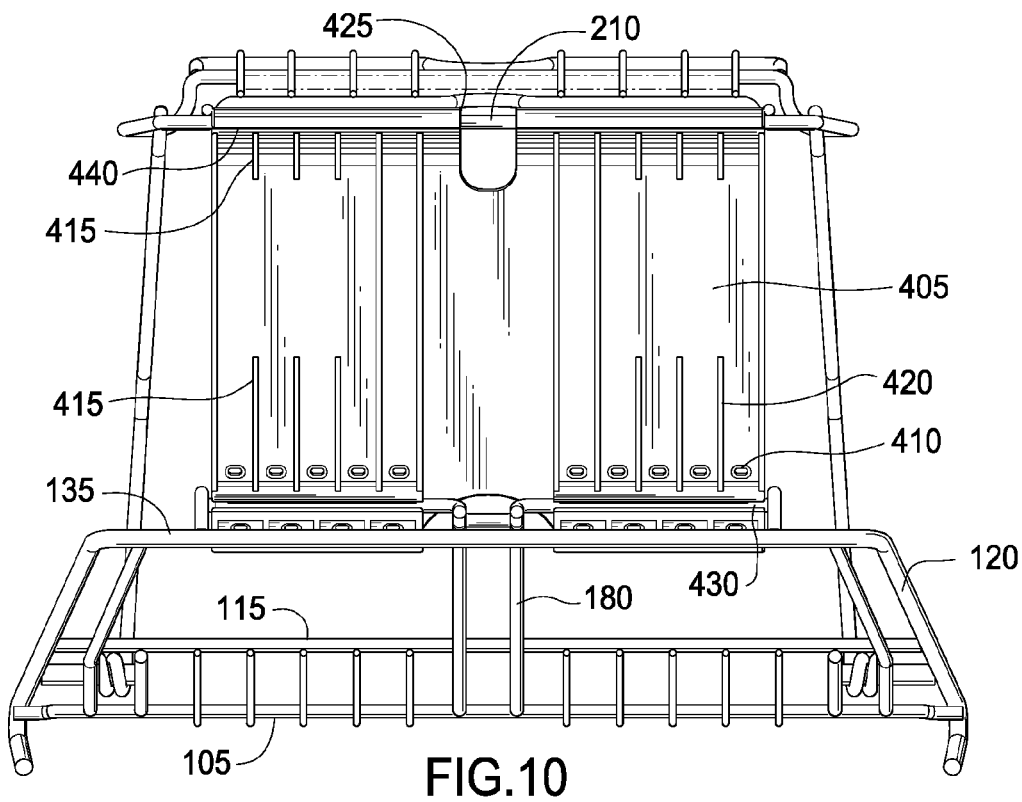
FIG. 10 is a bottom plan view of FIG. 1.
Figure 11:
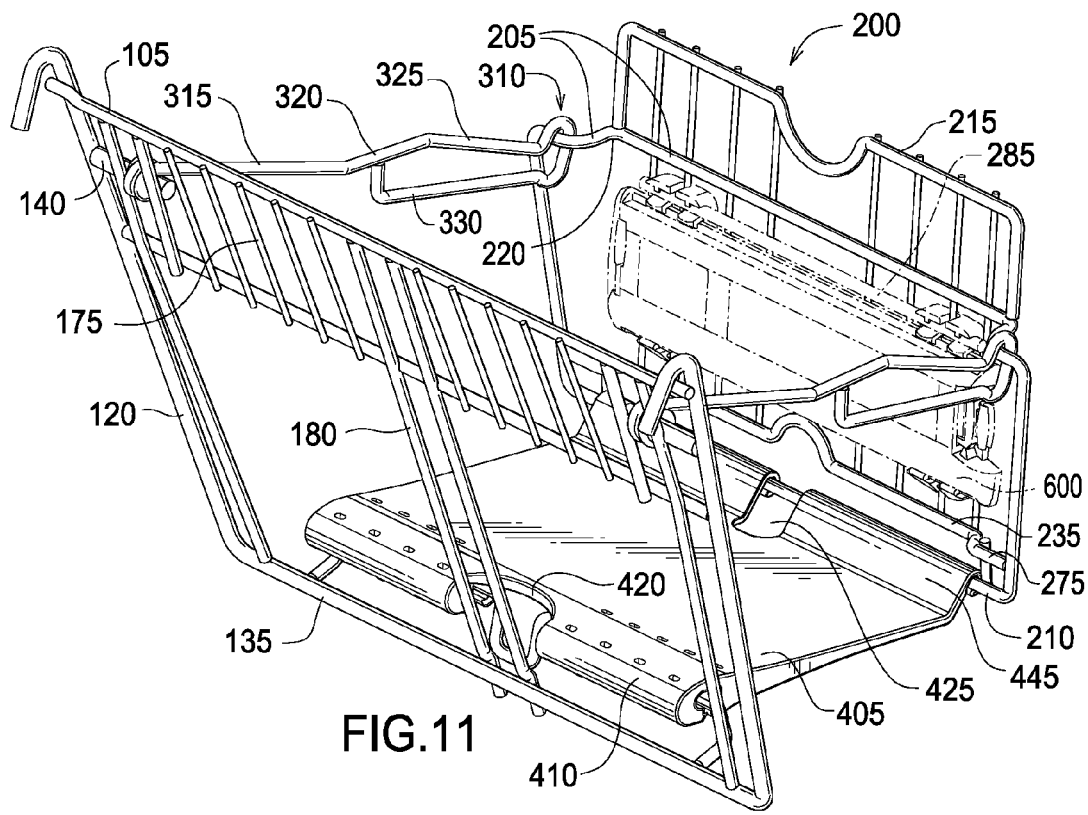
FIG. 11 is a rear perspective view of FIG. 1.

FIGS. 7 through 11 depict the interaction of the components of child seat 500. Turning first to FIG. 7, and referencing the other figures accordingly, second channel 435 of seat 405 envelops base wire 210 of back rest 200. Inclined portion 445 gives back rest 200 more elevation without making the back rest component 200 taller. This added elevation from inclined portion 445 allows back rest 200 to remain small enough to fold on top of base 400, and further allow the combination of back rest 200 and base 400 to fold against gate 100. Inclined portion 445 also creates space between base 400 and back rest 200 when these components are folded to accommodate an optional seat belt.

First portions 315 of arms 300 are welded around wires 140 of gate 100, forming coil 305. This style of welding around wires 140 prevents arms 300 from moving diagonally, thereby creating more stability. This style of welding also avoids a finger trap, wherein a young child's fingers may become stuck and/or injured as a result of placing his or her fingers in between parts of gate 100 and arms 300. The angle at which first portion of arm 315 attaches to gate 100 provides resistance so that a user can belt a child in without gate 100 falling.

Figures 12, 13:
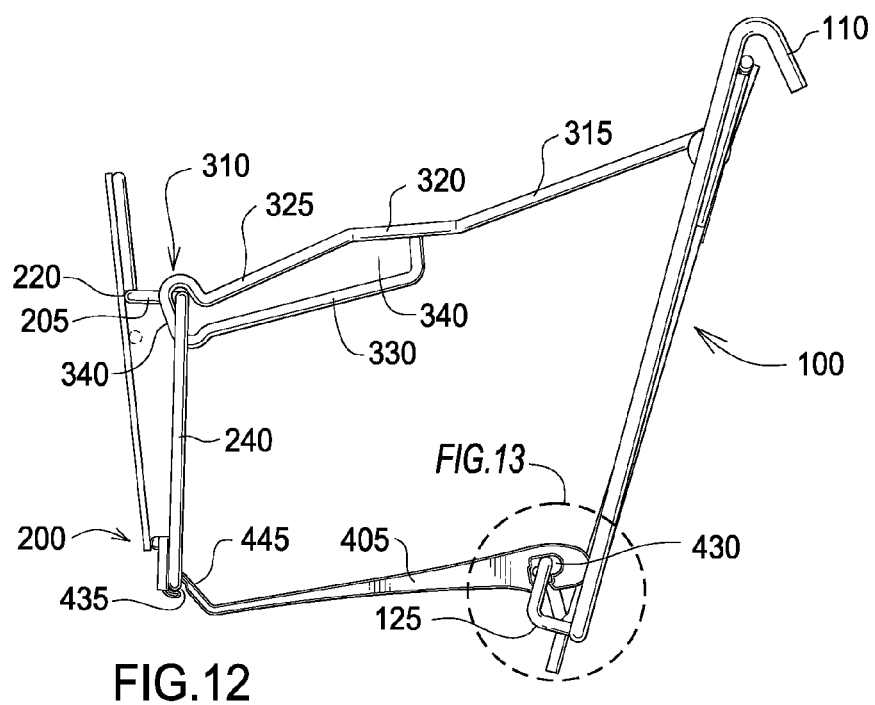
FIG. 12 is a side elevation view of the left and right sides, which are mirror images, of the child seat in the fully open position.
FIG. 13 is a close-up view of the locking mechanism indicated in FIG. 12.

Turning next to FIGS. 12 and 13, when seat 405 is attached to gate 100, attachment members 125 enter into first channel 430. Bar 160 interacts with stepped portion 440 of first channel 430, thereby preventing seat 405 from separating from gate 100. The shape of this locking mechanism allows for the multiple nesting options in the present child seat 500.

Turning next to FIGS. 14-16, when the child seat 500 is open, as depicted in FIG. 1, bulbous portion 310 of arm 300 encloses first horizontal support member 205 of back rest 200. As child seat 500 moves toward the partially closed position depicted in FIG. 14, wherein back rest 200 lays on top of base 400, first horizontal support member 205 enters chamber 340. The entry of first horizontal support member 205 into chamber 340 allows arms 300 to rotate downward into the position depicted in FIG. 14. When the child seat 500 is partially closed, as depicted in FIG. 14, first horizontal support member 205 rests near the base of chamber 340. As the child seat 500 moves between a partially closed position and a closed position, as depicted in FIG. 15, first horizontal support member 205 again enters chamber 340. When the child seat 500 is fully closed, as depicted in FIG. 16, first horizontal support member 205 rests at the approximate intersection of second portion 320 and third portion 325 of arm 300. The shape of chamber 340 allows first horizontal support member 205 to move easily through chamber 340. Thus, when back rest 200 folds onto base 400, base 400 can fold onto gate 100 with back rest 200 in the middle and not bind.

Figure 17:
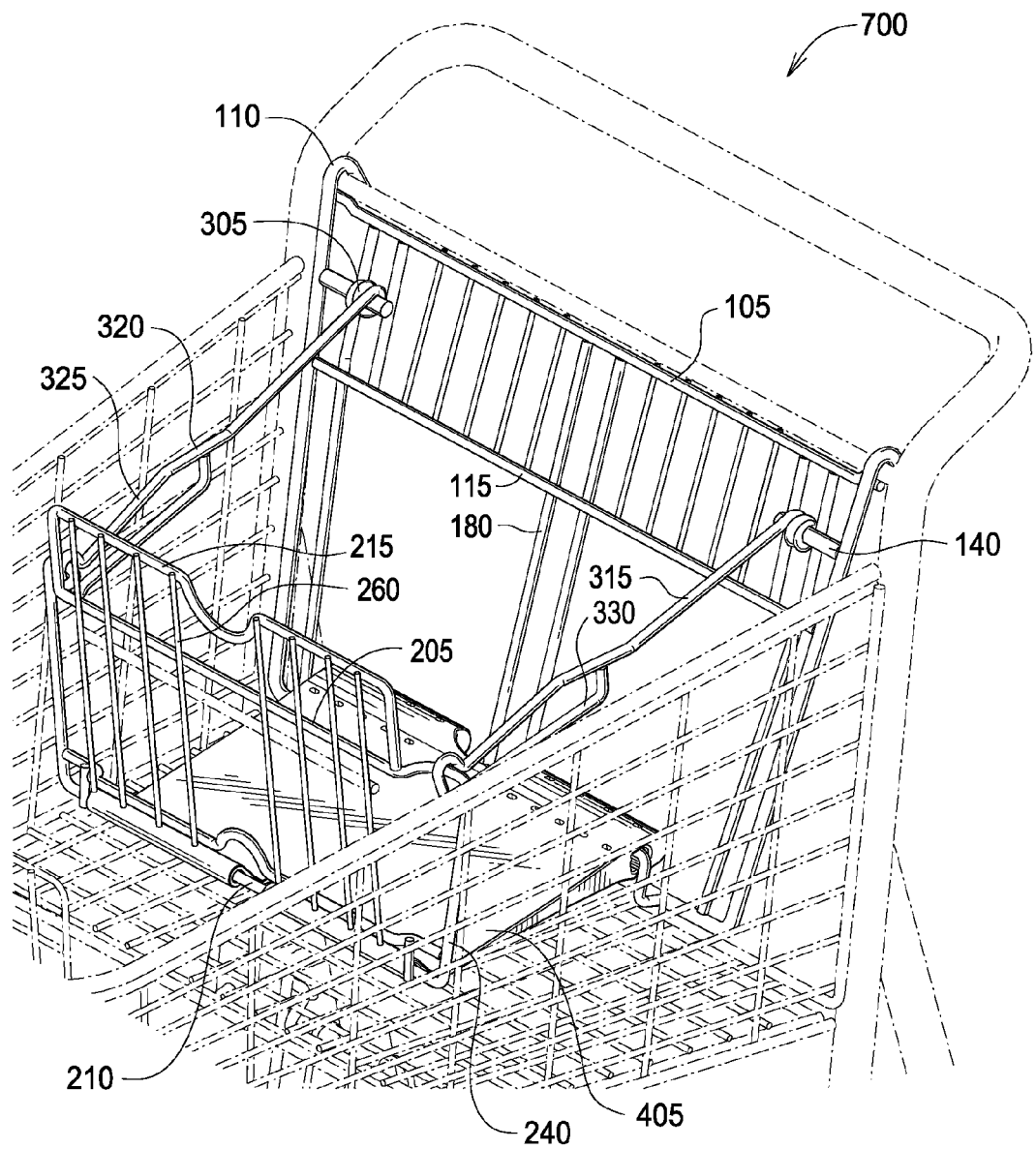
FIG. 17 is a front perspective view of the combined child seat and retention flap for use with a shopping cart of FIG. 1 with the retention flap in the down position with a shopping cart shown in dotted lines.
Figure 18:
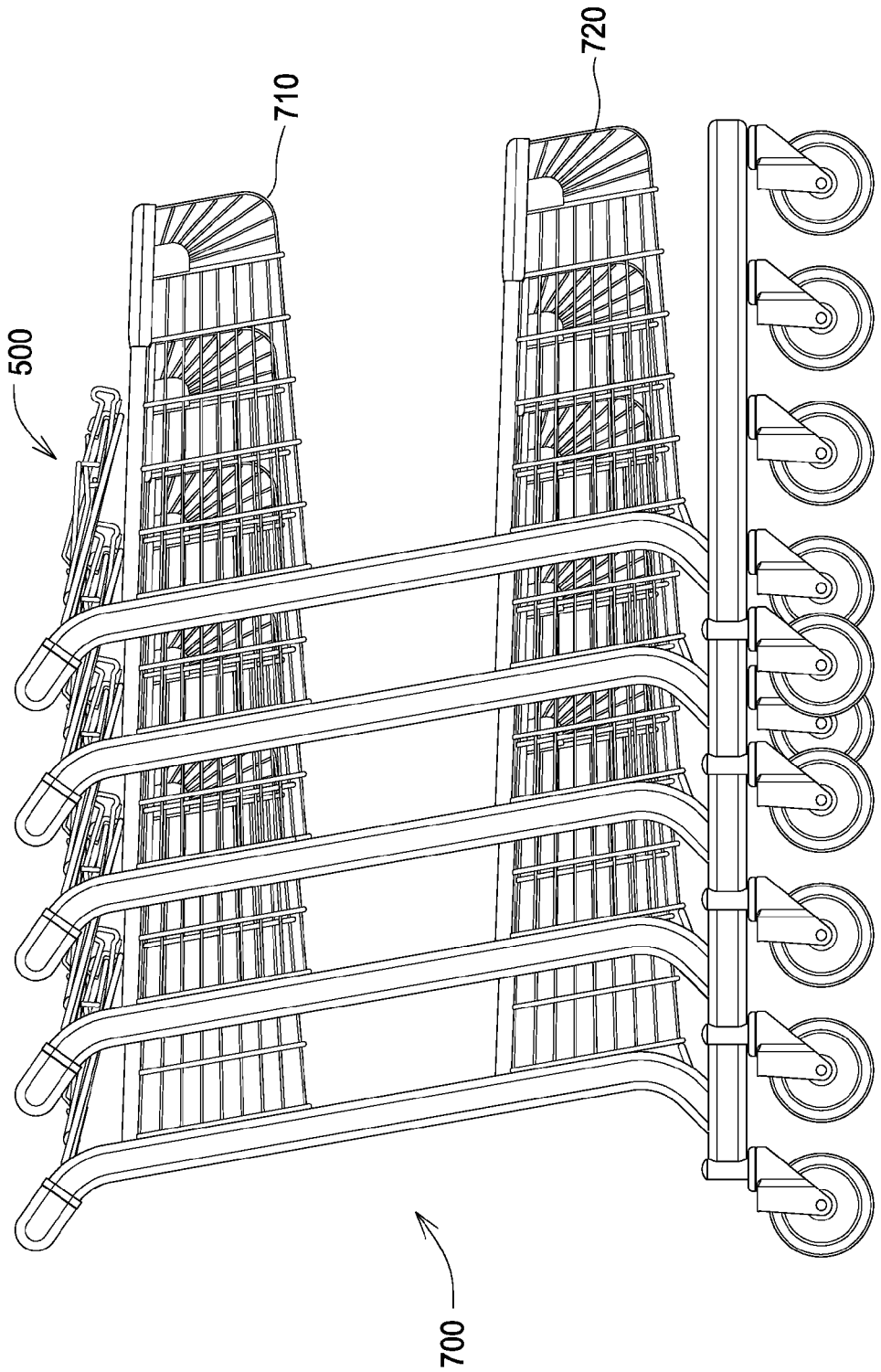
FIG. 18 is a side elevation view of the left and right sides, which are mirror images, of a series of shopping carts including the child seat of FIG. 1 in a nested position.

Turning to FIGS. 17 and 18, the assembled child seat is depicted in a shopping cart 700. Once assembled, child seat 500 is designed to be installed in either a single basket shopping cart or a two-tier shopping cart. Placing child seat 500 in a two-tier shopping cart, as depicted in FIG. 18, allows a child to sit in the base of the top basket of the cart, creating a lower center of gravity, which in turn provides greater stability. As shown in FIG. 18, when child seat 500 is completely closed, it can be pushed above the shopping cart 700, allowing the upper baskets 710 and lower baskets 720 to nest without interference from child seat 500.

While the components of child seat 500 have heretofore been described according to exemplary measurements, the size of the components can also be expressed as a ratio. In the depicted embodiment, the height of back rest 200 and the length of seat 400 are approximately equal. In the depicted embodiment, the length of arms 300 is approximately between 1.2 and 1.6 times the height of back rest 200 and length of seat 400. In the depicted embodiment, the hinge point where arm 300 connects to back rest 200 is approximately between 0.6 and 0.8 times the total height of back rest 200 measured from base wire 210. The length of the arm 300 is between 75 and 100 percent of the height of gate 100.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

In general the terms and phrases used herein have their art-recognized meaning, which can be found by reference to standard texts, journal references and contexts known to those skilled in the art. The above definitions are provided to clarify their specific use in the context of the invention.

All patents and publications mentioned in the specification are indicative of the levels of skill of those skilled in the art to which the invention pertains. All references cited herein are hereby incorporated by reference to the extent that there is no inconsistency with the disclosure of this specification. Some references provided herein are incorporated by reference herein to provide details concerning additional starting materials, additional methods of synthesis, additional methods of analysis and additional uses of the invention.

We claim:

1. A child seat for a shopping cart, comprising:
   a gate;
   a back rest;
   two arms; and
   a seat having a first and second opposing ends;
   wherein a first end of said arms connects to said gate;
   wherein a second end of said arms connects to said back rest;
   wherein the first end of the seat is connected to the gate and said second end of the seat is connected to the back rest;
   wherein said arms attach to said gate at a first elevation when said seat is open;
   wherein said arms attach to said back rest at a second elevation when said seat is open;
   wherein said first elevation is greater than said second elevation;
   wherein the height of said gate is greater than the span of said seat;
   wherein the height of said gate is greater than the height of said back rest;
   wherein the second end of said arms terminates in a chamber;
   wherein said chamber encloses a portion of said back rest;
   wherein said chamber is shaped to allow said portion of said backrest to move forward, backward, upward and downward relative to said chamber;
   wherein said gate includes attachment members protruding therefrom;
   wherein said first end of said seat includes a first channel;
   wherein said first channel envelops said attachment members;
   each attachment member includes a wire;
   said first channel includes a step; wherein
   said step interacts with each wire; and
   wherein said interaction locks said seat to said gate.

2. The child seat of claim 1, wherein said seat is attached to said back rest at an angle.

3. The child seat of claim 1, wherein said chamber further comprises:
   a first end of a generally straight first portion having a generally ascending direction connected to a first end of a generally straight second portion;
   said generally straight second portion having a generally descending direction;
   a second end of said generally straight second portion connected to a first end of a bulbous protrusion;
   a second end of said bulbous protrusion connected to a first end of a generally straight third portion;
   said generally straight third portion terminating at an angle to connect to a second end of said generally straight first portion.

4. The child seat of claim 1, wherein:
   said back rest further comprises a base wire;
   said second end of said seat comprises a second channel; and
   said second channel encompasses said base wire.

5. The child seat of claim 1, wherein:
   said back rest further comprises a top wire; and
   said top wire further comprises a first divot.

6. The child seat of claim 1, wherein the height of said gate is approximately 1.5 times the height of said back rest.

7. The child seat of claim 1, wherein the height of said gate is approximately 1.5 times the span of said seat.

8. The child seat of claim 1, wherein said gate is approximately 283 mm in height and said back rest is approximately 195 mm in height.

9. A child seat for a shopping cart, comprising:
   a gate;
   a back rest;
   two arms; and
   a seat having a first and second opposing ends;
   wherein a first end of said arms connects to said gate;
   wherein a second end of said arms connects to said back rest;
   wherein the first end of the seat is connected to the gate and said the second end of the seat is connected to the back rest;
   wherein said arms attach to said gate at a first elevation when said seat is open;
   wherein said arms attach to said back rest at a second elevation when said seat is open;
   wherein said first elevation is greater than said second elevation;
   wherein the height of said gate is greater than the span of said seat;
   wherein the height of said gate is greater than the height of said back rest;
   wherein the second end of said arms terminates in a chamber;
   wherein said chamber encloses a portion of said back rest;
   wherein an end of said chamber has a bulbous protrusion with a height greater than a height of the other end of said chamber to allow said portion of said backrest to move forward, backward, upward and downward relative to said chamber.

10. The child seat of claim 1, wherein said seat further comprises holes.

11. The child seat of claim 1, wherein said seat further comprises ribs.

12. The child seat of claim 1, wherein said first end of said arms is coiled around said gate.

13. The child seat of claim 1, wherein said gate includes at least one opening.

14. The child seat of claim 1, wherein said gate includes hooks for attaching said gate to a shopping cart.

15. The child seat of claim 1, wherein said back rest further comprises a belt.

16. A child seat for a shopping cart, comprising:
a gate;
a back rest;
two arms; and
a seat having a first and second opposing ends;
wherein a first end of said arms connects to said gate;
wherein a second end of said arms connects to said back rest;
wherein the first end of the seat is connected to the gate and said the second end of the seat is connected to the back;
wherein said arms attach to said gate at a first elevation when said seat is open;
wherein said arms attach to said back rest at a second elevation when said seat is open;
wherein said first elevation is greater than said second elevation;
wherein the height of said gate is greater than the span of said seat;
wherein the height of said gate is greater than the height of said back rest;
wherein the second end of said arms terminates in a chamber;
wherein said chamber encloses a portion of said back rest;
wherein said chamber is shaped to allow said portion of said backrest to move forward, backward, upward and downward relative to said chamber;
said back rest further comprises a first horizontal support member;
said first horizontal support member includes a jog; and
said chamber of said arm attaches to said jog.

17. The child seat of claim 16, wherein:
said back rest further comprises a second horizontal support member; and
said second horizontal support member further comprises a second divot.

18. The child seat of claim 9, wherein the first end of the seat comprises a channel, said channel including a divot.

19. The child seat of claim 9, wherein said second channel of the second end of the seat includes a divot.

20. A child seat for a shopping cart, comprising:
a gate;
a back rest;
two arms; and
a seat having a first and second opposing ends;
wherein a first end of said arms connects to said gate;
wherein a second end of said arms connects to said back rest;
wherein the first end of the seat is connected to the gate and said the second end of the seat is connected to the back;
wherein said arms attach to said gate at a first elevation when said seat is open;
wherein said arms attach to said back rest at a second elevation when said seat is open;
wherein said first elevation is greater than said second elevation;
wherein the height of said gate is greater than the span of said seat;
wherein the height of said gate is greater than the height of said back rest;
wherein the second end of said arms terminates in a chamber;
wherein said chamber encloses a portion of said back rest;
the child seat having a first partially closed position wherein the back rest is folded against the seat and a second closed position where-in the seat is folded against the gate and the back rest is folded against the seat.

* * * * *